(12) United States Patent
Shimakawa

(10) Patent No.: US 7,352,668 B2
(45) Date of Patent: Apr. 1, 2008

(54) OPTICAL DISC APPARATUS MANUFACTURING METHOD AND OPTICAL DISC APPARATUS

(75) Inventor: Shigeru Shimakawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 583 days.

(21) Appl. No.: 10/900,907

(22) Filed: Jul. 28, 2004

(65) Prior Publication Data

US 2005/0201227 A1    Sep. 15, 2005

(30) Foreign Application Priority Data

Mar. 10, 2004    (JP) ............................ P2004-066717

(51) Int. Cl.
*G11B 7/00* (2006.01)

(52) U.S. Cl. .................... 369/47.5; 369/47.53
(58) Field of Classification Search ............... 369/11.6, 369/47.5, 47.51, 47.52, 47.53, 116, 53.22, 369/120, 121

See application file for complete search history.

(56) References Cited

U.S. PATENT DOCUMENTS 6,975,572 B2 *   12/2005   Matsumoto .............. 369/47.53

FOREIGN PATENT DOCUMENTS

| JP | 11-213412 | 8/1999 |
|----|-----------|--------|
| JP | 2000-215610 | 8/2000 |
| JP | 2000-292361 | 10/2000 |
| JP | 2002-100046 | 4/2002 |
| JP | 2003-123299 | 4/2003 |
| JP | 2003-168214 | 6/2003 |
| JP | 2003-257030 | 9/2003 |

\* cited by examiner

*Primary Examiner*—Nabil Hindi
(74) *Attorney, Agent, or Firm*—Pillsbury Winthrop Shaw Pittman LLP

(57) ABSTRACT

A method for manufacturing an optical disc apparatus including: reading by an optical pickup head a medium on which signals are recorded with appropriate optical power; leading an RF signal corresponding to the recorded signal obtained from the medium by the reading by the optical pickup head to a β value calculation circuit and calculating a β value; and storing the calculated β value as a circuit offset into a circuit offset storage section, and an optical disc apparatus thus manufactured are disclosed.

7 Claims, 6 Drawing Sheets

OPTICAL DISC APPARATUS MANUFACTURING METHOD AND OPTICAL DISC APPARATUS

CROSS-REFERENCE TO RELATED APPLICATIONS

This application is based upon and claims the benefit of priority from the prior Japanese Patent Application No. 2004-66717, filed on Mar. 10, 2004; the entire contents of which are incorporated herein by reference.

BACKGROUND

1. Field of the Invention

The present invention relates to a method for manufacturing an optical disc apparatus and the optical disc apparatus each capable of using a recordable (or re-writable) optical disc as a medium and, more specifically, to a method for manufacturing an optical disc apparatus and the optical disc apparatus suitable for reducing the influence of characteristic variations of circuits.

2. Description of the Related Art

In recent years, an optical disc apparatus using various recordable (or re-writable) optical discs (CD and DVD) as media has been used in various applications. For example, for a CD-R (compact disc-recordable) as an example of the recordable optical disc, a calibration operation is performed in advance using an optical disc to be recorded on so as to allow for writing with appropriate optical power. Detailed contents are described in Orange Book, the specifications of CD-R.

The reason why calibration is required is that writing performed with inappropriate optical power causes a loss in spatial shape balance between land and pit formed by light irradiation. The prior arts relating to calibration include those described in Japanese Patent Laid-open Application No. 2002-100046 (Patent Document 1), Japanese Patent Laid-open Application No. 2003-123299 (Patent Document 2), Japanese Patent Laid-open Application No. 2003-168214 (Patent Document 3), and so on.

Besides, for example, in the case using CD-R as a recordable optical disc, photoelectric conversion of reflected light by an optical pickup head and amplification of an electric signal output after the photoelectric conversion are prerequisitely necessary when reading recorded information. The prior arts relating to processing when reading include those described in Japanese Patent Laid-open Application No. 2000-215610 (Patent Document 4), Japanese Patent Laid-open Application No. Hei 11-213412 (Patent Document 5), Japanese Patent Laid-open Application No. 2003-257030 (Patent Document 6), and so on.

By calibrating the writing optical power, appropriate optical power can be set for the present. The calibration operation, however, includes an operation of reading a predetermined signal which has been written as trial within a calibration area of a medium and obtaining the degree of imbalance between upper and lower parts ($\beta$ value) of the outputted waveform. In this event, the obtained $\beta$ value actually includes an offset inherently possessed by a circuit for obtaining a $\beta$ value. Accordingly, setting of the writing optical power with respect to the $\beta$ value thus obtained results in setting of the writing optical power offset from a real optimal value. As a result, writing is not optimally performed. Such offset inherently possessed by the circuit is not mentioned in the aforementioned documents.

Besides, for the photoelectric conversion by an optical pickup head and amplification of output after the photoelectric conversion, the photoelectric conversion sensitivity and the amplification gain are designed based on the reflectance of the optical disc so as to obtain a signal at a desired level as a level after amplification. Actually, the signal level after amplification, however, rarely becomes a desired level due to variations in the photoelectric conversion sensitivity and the amplification gain. Therefore, processing for a signal at the desired level cannot be performed, which may cause degradation in read performance. Note that such variations in photoelectric conversion sensitivity and the amplification gain are not mentioned in the aforementioned documents.

SUMMARY

The present invention has been developed in consideration of the above-described situation, and its object is to provide a method for manufacturing an optical disc apparatus and the optical disc apparatus each capable of using a recordable optical disc as a medium, in which the influence of characteristic variations of circuits and the like can be reduced to improve a write/read performance.

To solve the above problem, a method for manufacturing an optical disc apparatus according to the present invention comprises: reading by an optical pickup head a medium on which signals are recorded with appropriate optical power; leading an RF signal corresponding to the recorded signal obtained from the medium by the reading by the optical pickup head to a $\beta$ value calculation circuit and calculating a $\beta$ value; and storing the calculated $\beta$ value as a circuit offset into a circuit offset storage section.

More specifically, at the manufacturing stage, using a medium on which signals are recorded with appropriate optical power in advance, reading of the signal and calculation of a $\beta$ value using the read signal (RF signal) are performed, and the calculated $\beta$ value is stored in the circuit offset storage section as a circuit offset. The circuit offset stored in the circuit offset storage section can be used to calculate a real $\beta$ value when performing a calibration operation. When the $\beta$ value is accurately calculated in the calibration operation, an optimal writing optical power can be specified, whereby consequently the influence of characteristic variations of circuits can be reduced to improve the write/read performance.

Further, an optical disc apparatus according to the present invention comprises: an optical writing section recording a signal onto a recording medium with writing optical power changed; an optical reading section reading the written signal from the recording medium; a $\beta$ value calculation circuit calculating a $\beta$ value using an RF signal corresponding to the recorded signal obtained from the recording medium by the optical reading section; a circuit offset storage section prestoring a circuit offset value possessed by the $\beta$ value calculation circuit; and a writing optical power setting section subtracting the stored circuit offset value from the calculated $\beta$ value to create a corrected $\beta$ value and setting appropriate writing optical power based on the corrected $\beta$ value.

More specifically, this optical disc apparatus stores in its circuit offset storage section the circuit offset obtained by, for example, the above-described manufacturing method which is used for correction when calculating the $\beta$ value of the RF signal obtained by optical reading. Since the $\beta$ value which has been corrected (corrected $\beta$ value) is accurate, it is possible to appropriately specify an optimal writing optical power, whereby consequently the influence of characteristic variations of circuits can be reduced to improve the write/read performance.

Further, another method for manufacturing an optical disc apparatus according to the present invention comprises: reading by an optical pickup head a medium on which signals are recorded with appropriate optical power; boosting by an amplifier set to a fixed gain an RF signal corresponding to the recorded signal obtained from the medium by the reading by the optical pickup head; comparing a level of the RF signal obtained by the boosting with a prescribed level; and offsetting the gain setting of the amplifier from an initial setting based on a result of the comparison.

More specifically, at the manufacturing stage, using a medium on which signals are recorded with appropriate optical power in advance, reading and boost are performed. Then, the resultant level is compared with the prescribed level and the gain of the amplifier is offset from the initial setting based on the comparison result. This makes it possible to obtain the amplifier output level without variations for a standard disc. Consequently, the influence of characteristic variations of circuits can be reduced to improve the write/read performance.

Further, another optical disc apparatus according to the present invention comprises: an optical pickup head; an amplifier boosting an RF signal obtained from a medium by reading by the optical pickup head; and a gain setting input supply section supplying a gain setting input to the amplifier so that an output level of the amplifier becomes a predetermined level.

More specifically, this optical disc apparatus has a configuration in which the offset state of the amplifier gain obtained by, for example, the above-described method is held by the gain setting input from the gain setting input supply section. According to the above, the amplifier output level is kept constant to enable high-quality operation in subsequent processing, whereby the influence of characteristic variations of circuits can be reduced to improve the write/read performance.

According to the present invention, in a method for manufacturing an optical disc apparatus and the optical disc apparatus each capable of using a recordable optical disc as a medium, the influence of characteristic variations of circuits can be reduced to improve the write/read performance.

DETAILED DESCRIPTION

Description of Embodiments

Figure 1A:
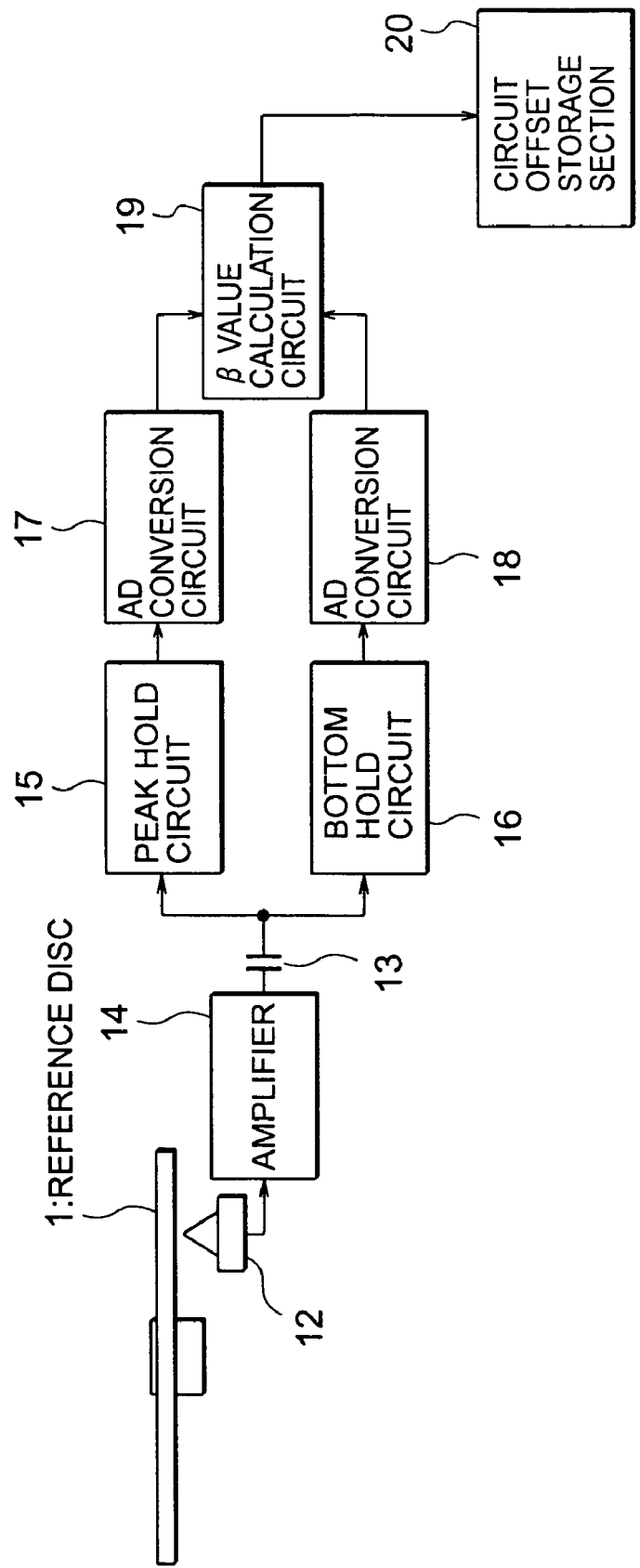
FIG. 1A and FIG. 1B are block diagrams showing a configuration of an optical disc apparatus according to an embodiment of the present invention.

Embodiments of the present invention will be described with reference to the drawings. These drawings are provided only for the illustrative purpose and, in any respect, are not intended to limit the present invention.

As an aspect of the present invention, the calculating a $\beta$ value may calculate the $\beta$ value as a digital value. Any digital value can be readily held in a nonvolatile manner and is thus suitable for the configuration of an optical disc apparatus.

Further, as an aspect, the storing the calculated $\beta$ value into a circuit offset storage section stores the $\beta$ value as a digital value into the circuit offset storage section. This realizes a simple configuration using a digital memory as the circuit offset storage section.

Further, as an aspect of the optical disc apparatus, it is also possible that the $\beta$ value calculation circuit calculates the $\beta$ value as a digital value, and that the circuit offset storage section stores the circuit offset value as a digital value.

Further, as an aspect, it is possible that the boosting an RF signal is performed a plurality of times with the fixed gain of the amplifier changed, and that the offsetting the gain setting of the amplifier uses as the gain setting of the amplifier the fixed gain in boost providing an RF signal at a level closest to the prescribed level out of the plurality of times of boost. The gain is varied so as to determine appropriate gain setting from their results.

Further as an aspect as the optical disc apparatus, it is possible that the gain setting input supply section supplies the gain setting input using a set value held as a digital value. Any digital value can be readily held in a nonvolatile manner and is thus suitable for the configuration of an optical disc apparatus.

Further, as an aspect, the optical disc apparatus may further comprise: an error rate measurement section measuring an error rate of an output of the amplifier; and a second gain setting input supply section supplying a gain setting input to the amplifier so that the measured error rate becomes a predetermined value or lower. This is for finely adjusting the amplifier gain with respect to the error rate for an actual optical disc that is not a standard optical disc.

Here, it is also adoptable that the second gain setting input supply section supplies the gain setting input using a set value held as a digital value. This realizes a simple configuration using a digital memory as the second gain setting input supply section.

Further, in the above configuration, it is also adoptable that the second gain setting input supply section is further capable of supplying a plurality of gain setting inputs as the gain setting input to the amplifier, that the error rate measurement section further measures error rates of the output of the amplifier in the respective plurality of gain setting inputs, and that the second gain setting input supply section supplies the amplifier with the gain setting input which provides a minimum error rate out of the error rates of the output of the amplifier in the respective plurality of gain setting inputs. This is for varying the gain setting input so as to determine appropriate gain setting from their results.

Figure 1B:
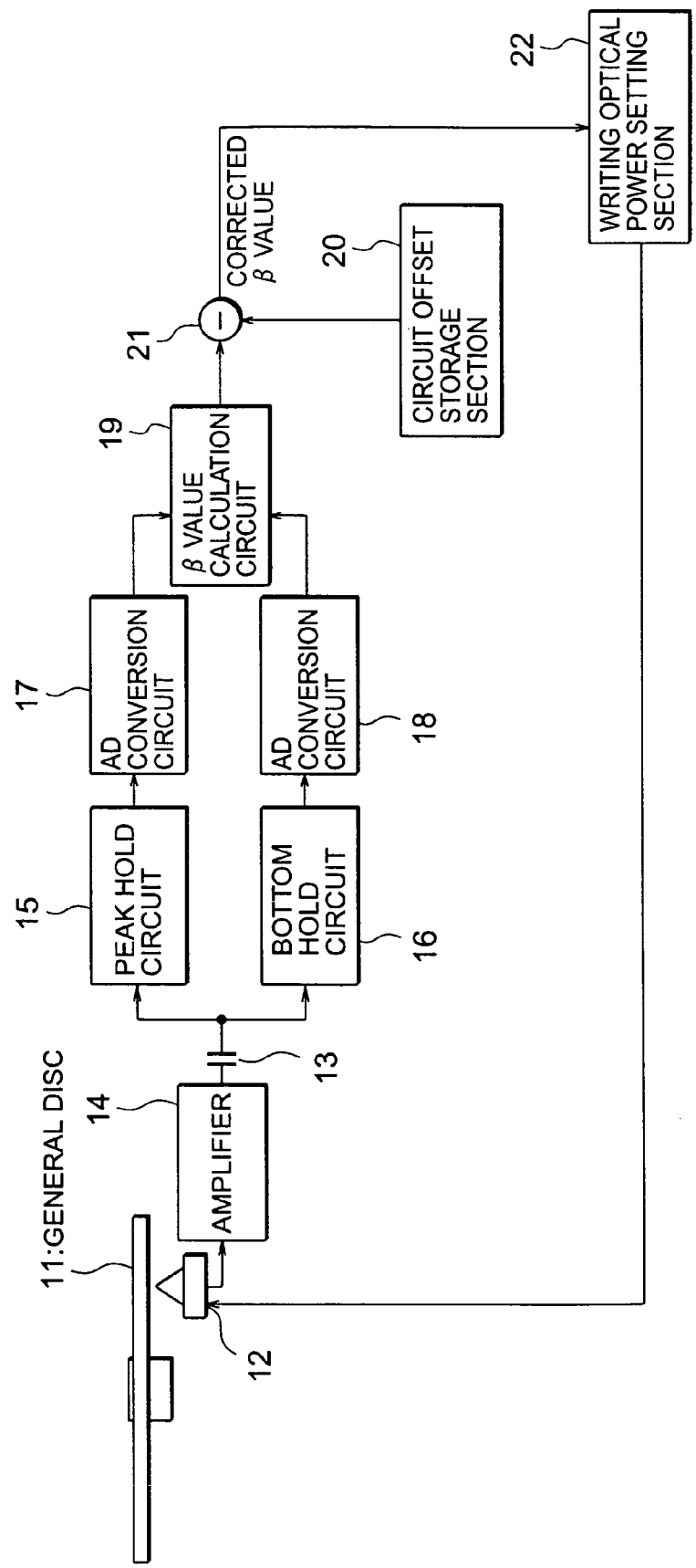

In consideration of the above, embodiments of the present invention will be described below with reference to the drawings. FIG. 1A and FIG. 1B are block diagrams showing the configuration of an optical disc apparatus according to an embodiment of the present invention. FIG. 1A is for explaining an operation (a circuit offset measurement and holding operation) in a step necessary at a manufacturing stage of this optical disc apparatus, and FIG. 1B is for explaining one of the operations in use by a user (a calibration operation). FIG. 1A and FIG. 1B are illustration in a range necessary for explaining these operations, and thus there actually exist components necessary as the optical disc apparatus in addition to them. This point is well known and its explanation will be omitted.

FIG. 1A shows a step of the circuit offset measurement and holding operation performed at the manufacturing stage of this optical disc apparatus. At the stage of this step, assembly of necessary electrical hardware should have already been finished. As shown in FIG. 1A, this optical disc apparatus has an optical pickup head 12, an amplifier 14, a DC cut capacitor 13, a peak hold circuit 15, a bottom hold circuit 16, AD conversion circuits 17 and 18, a β value calculation circuit 19, and a circuit offset storage section 20. A reference disc 1 is used for which reading is performed. The reference disc 1 is a disc for adjustment in which a β value (described later) is written to be 0 (zero). Such a reference disc 1 can be prepared by writing into a standard disc a predetermined signal with appropriate writing optical power to establish β=0 using, for example, a writing apparatus being a reference.

The optical pickup head 12 irradiates a recording face of the disc 1 with light, receives its reflected light, photoelectrically converts it, and outputs an electrical signal as an operation at the time of reading, in which, for example, a laser diode is used for light irradiation and a photo diode is used for photoelectric conversion. The outputted electrical signal is supplied to the amplifier 14. The amplifier 14 is for amplifying the supplied electrical signal (RF signal) to a level where the signal is readily processed. The amplified RF signal output is supplied via the DC cut capacitor 13 to the peak old circuit 15 and the bottom hold circuit 16. The amplifier 14 may be configured such that it is integrally incorporated in the optical pickup head 12.

The peak hold circuit 15 and the bottom hold circuit 16 are for holding a peak level and a bottom level, respectively, of a signal supplied with a DC component cut off and outputting them. The peak level and the bottom level obtained by the holding are supplied to the AD conversion circuit 17 and the AD conversion circuit 18, respectively. The AD conversion circuit 17 and the AD conversion circuit 18 are each for converting the supplied signal (the peak level or the bottom level) from an analog form to a digital form. The digital signals obtained in conversion are supplied to the β value calculation circuit 19.

Figure 2:
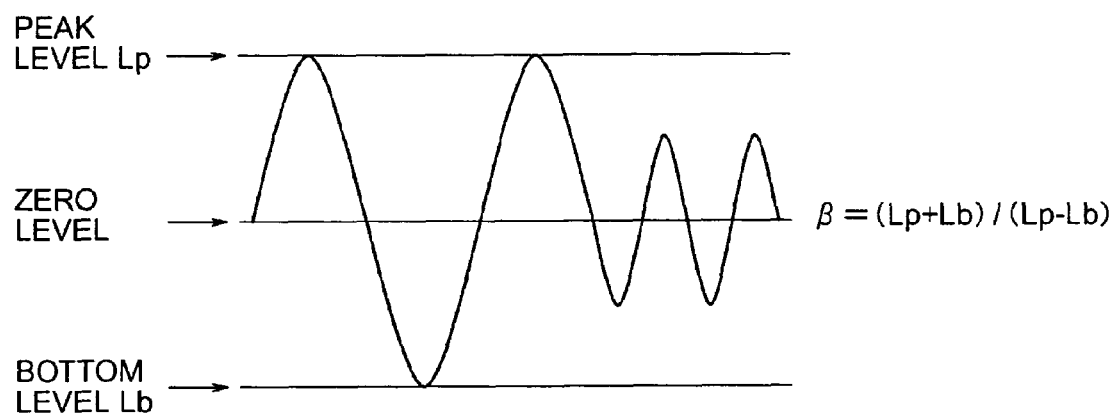
FIG. 2 is an explanatory view illustrating the definition of a $\beta$ value.

The β value calculation circuit 19 is for carrying out an operation in accordance with a predetermined equation to calculate a β value. This operation follows the equation as shown in FIG. 2. FIG. 2 is an explanatory view illustrating the definition of the β value. Specifically, $\beta=(Lp+Lb)/(Lp-Lb)$ is calculated where the peak level is represented by $Lp$ and the bottom level is represented by $Lb$. The β value is, simply stated, an index showing the degree of imbalance between upper and lower parts of a waveform. From the viewpoint, it can be simply said that preferably the β value becomes 0. The bottom level corresponds to a pit (=low reflectance) on the recording face of the reference disc 1, and the peak level corresponds to a land (=high reflectance) of the same. When β=0, it means that pit formation balances with the land in a spatial relationship. Actually (i.e. in use by a user), a value shifted from β=0 (from 0.01 to a value up to its several times) is often regarded as optimal in consideration of unevenness in land, influence of frequency characteristics caused by optical reading and writing, and so on.

Since the purpose is to obtain the offset of a circuit here, such a reference disc 1 is used that when a signal is read and a circuit with no offset is used, β is calculated as zero. Therefore, the calculation result of the β value calculation circuit 19 becomes zero if the circuits 15, 16, 17 and 18 are ideal, whereas β is actually calculated as a certain nonzero value due to influence of characteristic variations of the circuits 15, 16, 17 and 18.

This value obtained in the β value calculation circuit 19 is supplied as a circuit offset to the circuit offset storage section 20. The circuit offset storage section 20 is a nonvolatile digital memory which sets the supplied value as the circuit offset for β value calculation inherently possessed by the optical disc apparatus and thereafter semipermanently holds it.

The reference disc 1 is described to be regarded as a so-called absolute reference in the above description, but it is also conceivable that the discs regarded as references slightly differ depending on the kinds of media, such as a CD, DVD-R/-RW/-RAM, or on the media manufacturers. Hence, it is conceivable to use the discs recognizable as their references to obtain the circuit offsets in respective cases and correspond them with the kinds of media, the media manufacturers' names, and so on into a table, which is held in the circuit offset storage section 20. This table is used in the calibration operation.

FIG. 1B shows a calibration operation for setting writing optical power which is performed in advance when the user uses a general disc for recording. In FIG. 1B, the same numerals are assigned to the same components as those shown in FIG. 1A. As shown in FIG. 1B, this optical disc apparatus has a subtractor 21 and a writing optical power setting section 22 as well as the components shown in FIG. 1A.

Figure 3:
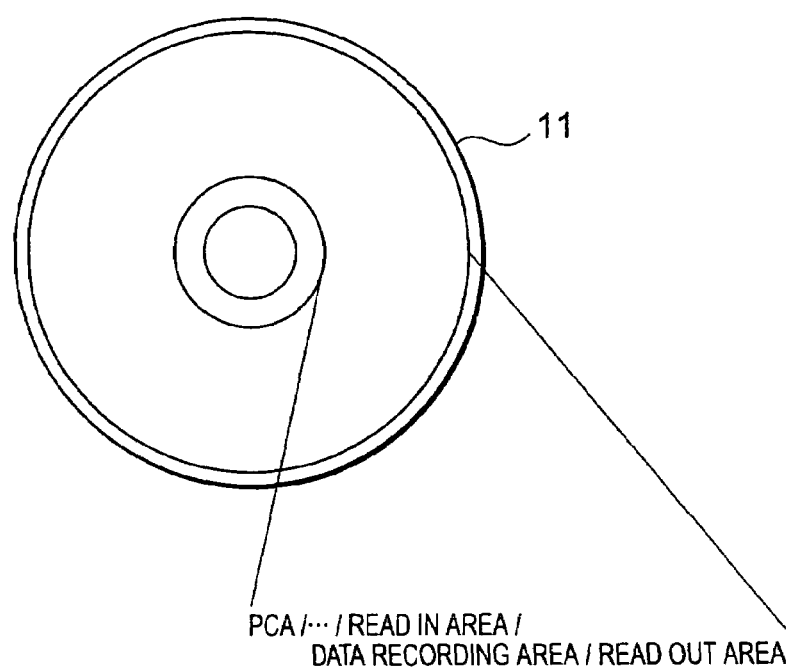
FIG. 3 is an explanatory view showing the area alignment on a recording face of the disc.

This case uses a general disc 11. On the recording face of the general disc 11, areas are aligned as shown in FIG. 3, for example, on a CD-R. FIG. 3 is an explanatory view showing the area alignment on the recording face of the disc. From the inner peripheral side, a PCA (power calibration area), . . . , a read-in area, a data recording area, and a read-out area. The PCA is a well-known trial writing area for setting the writing optical power.

The calibration operation itself is performed as known except that the circuit offset storage section 20 and the subtractor 21 are inserted. More specifically, a predetermined signal is written into the PCA of the disc 11 by the optical pickup head 12 (more specifically, a laser diode included in the head 12) with, for example, writing optical power at each intensity set by the writing optical power setting section 22. Then, this written signal is read out by the optical pickup head 12 and thereafter led to, as in the description in FIG. 1A, to the amplifier 14, the DC cut capacitor 13, the peak hold and bottom hold circuits 15 and 16, the AD conversion circuits 17 and 18, and the β value calculation circuit 19 to calculate the β value. The calculated β value is supplied to the subtractor 21, and the circuit offset held in the circuit offset storage section 20 is subtracted from the supplied β value. This provides a corrected β value.

The writing optical power setting section 22 specifies appropriate writing optical power using this corrected β value. The specified writing optical power fixedly becomes a setting output of the writing optical power setting section 22 only when the disc 11 is used for recording. The appropriate writing optical power is determined such that the corrected β value becomes, for example, 0 or a value shifted from β=0 (from 0.01 to a value up to its several times) in consideration of unevenness in land, influence of frequency characteristics caused by optical reading and writing, and so on.

In the configuration described above, the β value (corrected β value) can be calculated independent of the characteristic variations of the circuits 15, 16, 17 and 18 and so on. This enables grasp of an accurate β value (corrected β value) as a state of recording onto the disc 11, leading to appropriately set writing optical power.

It should be noted that in the above-described calibration operation, when the circuit offsets stored in the circuit offset storage section 20 are summarized into a table in correspondence with the kinds of media, the media manufacturers, and so on, the kind of medium and the manufacturer's name of the general disc 11 in use are recognized, and then the value for the kind of medium and the manufacturer in common with the above is used. This enables finer and more accurate calibration.

Figure 4:
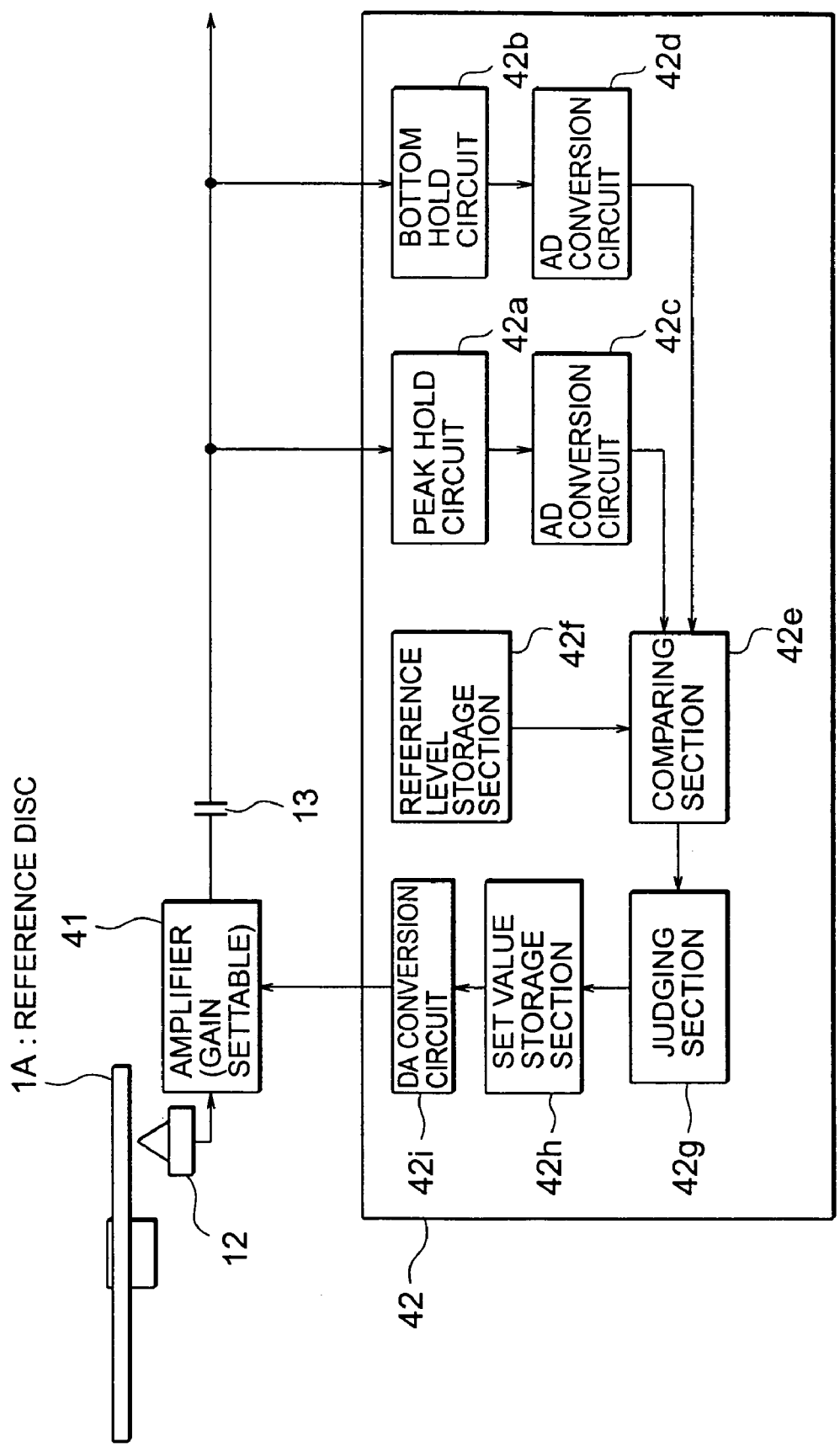
FIG. 4 is a block diagram showing a configuration of an optical disc apparatus according to another embodiment of the present invention.

Next, an optical disc apparatus according to another embodiment of the present invention will be described with reference to FIG. 4. FIG. 4 is a block diagrams showing the configuration of the optical disc apparatus according to another embodiment of the present invention, and for explaining an operation (an amplifier gain setting operation) in a step necessary at a manufacturing stage thereof. FIG. 4 is illustration in a range necessary for explaining this operation, and thus there actually exist components necessary as the optical disc apparatus in addition to them. This point is well known and its explanation will be omitted. Note that the same numerals are assigned to components substantially equivalent to those which have already been described.

This step aims to set the gain of an amplifier 41 to a predetermined value. The amplifier 41 is one whose gain is controlled by the voltage from the outside (a voltage controlled gain amplifier), in which the gain is set by an analog output from a DA conversion circuit 42i of a gain setting input supply section 42. The amplifier 41 is for amplifying (boosting) a read output of the optical pickup head 12.

The gain setting input supply section 42 has, as shown in the drawing, a peak hold circuit 42a, a bottom hold circuit 42b, AD conversion circuits 42c and 42d, a comparing section 42e, a reference level storage section 42f, a judging section 42g, and a set value storage section (nonvolatile digital memory) 42h in addition to the DA conversion circuit 42i. As a reference disc 1A, such a disc is used that has a standard reflectance and in which writing is performed with appropriate optical power.

The gain setting (design value) of the amplifier 41 is set such that the output level of the amplifier 41 becomes a predetermined level in consideration of the reflectance of the disc and the photoelectric conversion sensitivity of the optical pickup head 12. The output level, however, actually varies among individual apparatuses due to characteristic variations possessed by the amplifier 41. Hence, the variation in the output level of the amplifier 41 is absorbed by allowing the set value storage section 42h to hold a set value according to the characteristic variation of the amplifier 41.

Figure 5:
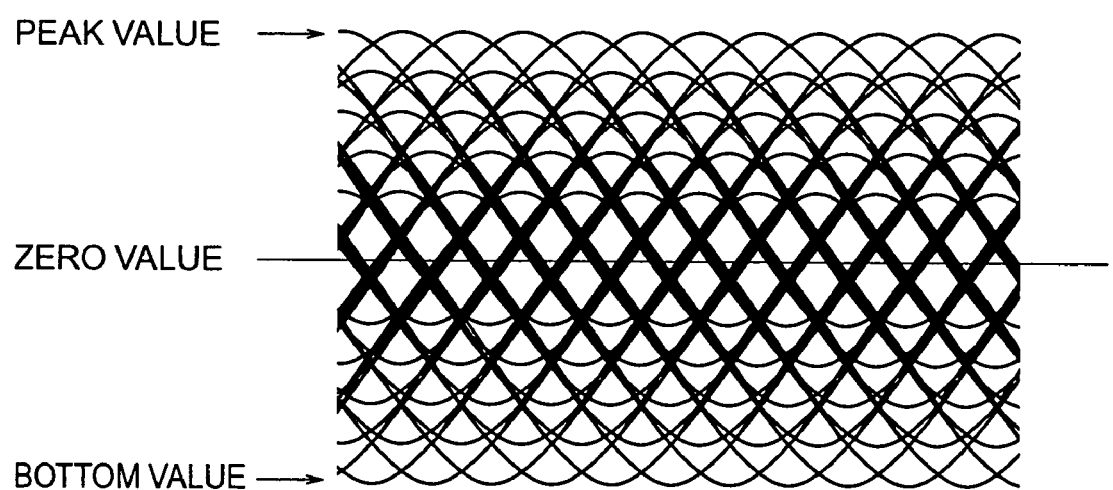
FIG. 5 is an explanatory view illustrating a peak value and a bottom value of a general RF signal.

The peak hold circuit 42a and the bottom hold circuit 42b are for holding and outputting a peak value and a bottom value of the RF signal that is the output of the DC cut capacitor 13 respectively. Its aspect is as shown, for example, in FIG. 5. FIG. 5 is an explanatory view illustrating a peak value and a bottom value of a general RF signal. The outputted peak value and bottom value are supplied to the AD conversion circuits 42c and 42d respectively.

The AD conversion circuits 42c and 42d convert the supplied peak value and bottom value from an analog form to a digital form. The two digital signals obtained in the conversion are supplied to the comparing section 42e. The comparing section 42e compares a value corresponding to the reference level from the reference level storage section 42f and a value of the difference between the AD conversion circuits 42c and 42d. The result of comparison (difference) is sent to the judging section 42g. Note that the reference level stored in the reference level storage section 42f is a level corresponding to a value to be set as the output level of the amplifier 41. The judging section 42g stores the sent difference and the value outputted by the set value storage section 42h to the DA conversion circuit 42i in a pair and then works on the set value storage section 42h to update the value to be outputted by the set value storage section 42h.

When the value outputted by the set value storage section 42h is updated, the output level of the DA conversion circuit 42i according to the value is supplied to the amplifier 41. Thereafter, the operation of the gain setting input supply section 42 by reading the reference disc 1A is performed a plurality of times in a similar manner. By this operation, a plurality of pairs each composed of the sent difference and the value outputted by the set value storage section 42h to the DA conversion circuit 42i are stored in the judging section 42g. The judging section 42g selects a pair having the smallest difference out of these pairs and judges that the value outputted by the set value storage section 42h to the DA conversion circuit 42i at that time is the final value to be held by the set value storage section 42h. The result of the judgment is led to the set value storage section 42h, and this value is semipermanently held thereafter in the set value storage section 42h (nonvolatile digital memory). This appropriately offsets the gain of the amplifier 41 from the initial setting.

According to this embodiment, the output level of the amplifier 41, without variations among individual apparatuses to a standard disc, can be obtained. Accordingly, the influence of the characteristic variations of the optical pickup head 12 and the amplifier 41 can be reduced to improve the read performance. It should be noted that the judging section 42g stores a plurality of "pairs each composed of the sent difference and the value outputted by the set value storage section 42h to the DA conversion circuit 42i" and determines the value that the set value storage section 42h should hold based on the stored pairs in the above description, but it is also adoptable to take such a simple way that the initial setting is offset based on the above-described difference obtained in an initial setting of the set value storage section 42h and semipermanently held.

Figure 6:
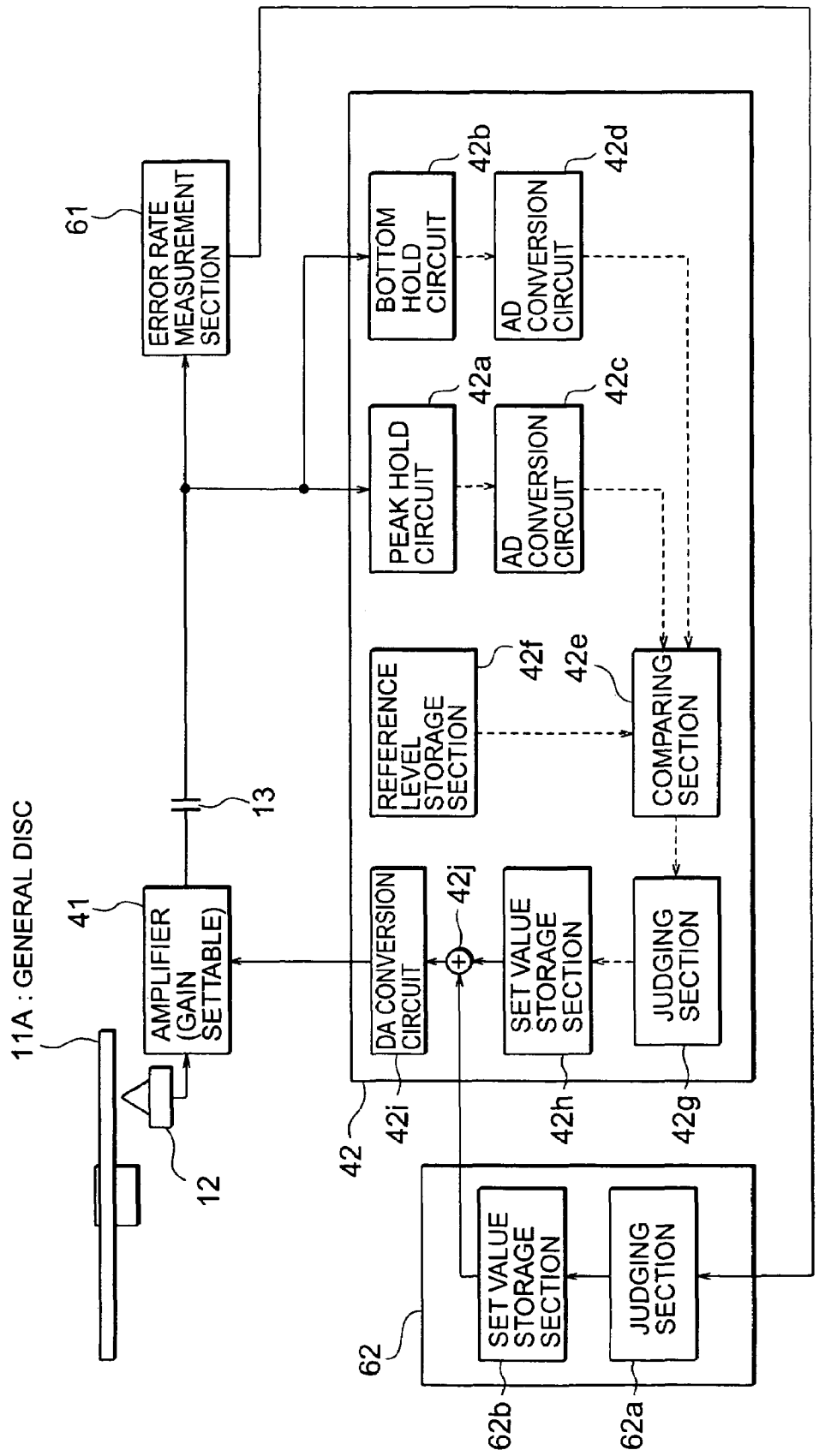
FIG. 6 is a block diagram showing a configuration of an optical disc apparatus according to still another embodiment of the present invention.

Next, an optical disc apparatus according to still another embodiment of the present invention will be described with reference to FIG. 6. FIG. 6 is a block diagram showing the configuration of the optical disc apparatus according to still another embodiment of the present invention, showing an operation when a user uses a general disc 11A for reading. In FIG. 6, the same numerals are assigned to the same components as those shown in FIG. 4, but arrows are illustrated in broken-line between part of the components. This broken-line illustration represents nonfunctioning in this operation.

As shown in FIG. 6, this optical disc apparatus additionally has an error rate measurement section 61 and a second gain setting input supply section 62. The second gain setting input supply section 62 has a judging section 62a and a set value storage section (digital memory) 62b. Further, an adding circuit 42j is added to the gain setting input supply section 42. This embodiment is constituted by providing a new element so that the error rate of the RF signal obtained by reading from the disc 11A becomes a predetermined value or lower or minimum. According to such a configuration, setting of the gain of the amplifier 41 can be frequently changed in accordance with a disc used by the user with respect to the error rate.

The error rate measurement section 61 is for measuring the error rate after performing necessary signal processing for the RF signal obtained by reading from the disc 11A. To measure the error rate, a signal for measuring the error rate is recorded on the disc 11A in advance. As such a signal, one written with appropriate optical power out of the signals within the PCA can be used. Note that both of the rate as byte and the rate as bit can be employed as the error rate. The result of measurement of the error rate is sent to and held in the judging section 62a.

The judging section 62a stores the sent result of the error rate measurement and the value outputted by the set value storage section 62b to the adding circuit 42j in a pair and then works on the set value storage section 62b to update the value to be outputted by the set value storage section 62b. When the value outputted by the set value storage section 62b is updated, the output level of the DA conversion circuit 42i according to the value is supplied to the amplifier 41 via the adding circuit 42j. Thereafter, the operation of the second gain setting input supply section 62 by reading from the disc 11A is repeated a plurality of times in a similar manner. By this operation, a plurality of pairs each composed of the measurement result of the error rate and the value outputted by the set value storage section 62b to the adding circuit 42j are stored in the judging section 62a.

The judging section 62a selects a pair having the minimum (best) error rate from among these pairs and judges that the value outputted by the set value storage section 62b to the adding circuit 42j at that time is the value to be outputted by the set value storage section 62b. The result of the judgment is led to the set value storage section 62b so that the output of the set value storage section 62b (digital memory) is set to this value. This setting is continued until the disc 11A is changed, and after the change the gain setting of the amplifier 41 is finely adjusted again in a similar manner.

According to this embodiment, setting of the gain of the amplifier 41 can be frequently changed in accordance with a disc used by the user with respect to the error rate by the RF signal. It should be noted that the judging section 62a stores a plurality of "pairs each composed of the sent result of the error rate measurement and the value outputted by the set value storage section 62b to the adding circuit 42j" and determines the value that the set value storage section 62b should output based on the stored pairs in the above description, but it is also adoptable to take such a simple way that error rate measurement by next setting is performed only when the error rate obtained in an initial setting of the set value storage section 62b is worse than a predetermined value, and subsequently error rate measurement by next setting is performed only when the error rate is worse than the predetermined value, so that the error rate is led into a state better than the predetermined value. It is possible that when the obtained state of error rate is worse than the predetermined value by every setting in the above case, the best setting, for example, can be selected from among them.

It is to be understood that the present invention is not intended to be limited to the specific embodiments described with reference to the drawings and all changes which come within the meaning and range of equivalency of the claims are therefore intended to be embraced therein.

What is claimed is:

1. A method for manufacturing an optical disc apparatus, comprising:
    reading by an optical pickup head a reference medium on which signals are recorded with appropriate optical power, to obtain an RF signal;
    leading the RF signal obtained from the reference medium by the reading by the optical pickup head to a $\beta$ value calculation circuit having an inherent offset;
    estimating a value of the inherent offset by calculating a $\beta$ value in the $\beta$ value calculation circuit using the RF signal; and
    storing the value of the inherent offset into a circuit offset storage section that is a non-volatile memory.

2. The method for manufacturing an optical disc apparatus as set forth in claim 1,
    wherein the calculating the $\beta$ value calculates the $\beta$ value as a digital value.

3. The method for manufacturing an optical disc apparatus as set forth in claim 2,
    wherein the storing the value of the inherent offset into the circuit offset storage section stores the value of the inherent offset as a digital value into the circuit offset storage section.

4. The method for manufacturing an optical disc apparatus as set forth in claim 1,
    wherein the reference medium on which signals are recorded with appropriate optical power is prepared in plural in different kinds or from different manufacturers of media, and the reading the reference medium by the optical pickup head, the leading the RF signal to the $\beta$ value calculation circuit, the estimating the value of the inherent offset, and the storing into the circuit offset storage section are performed for each of the reference medium, the value of the inherent offset being store into the circuit offset storage section in correspondence with a kind of medium or a manufacturer of medium.

5. An optical disc apparatus, comprising:
    an optical writing section configured to record a signal onto a recording medium with writing optical power changed;
    an optical reading section configured to read the signal from the recording medium, to obtain an RF signal;
    a $\beta$ value calculation circuit, having an inherent offset, configured to calculate a $\beta$ value using the RF signal;
    a circuit offset storage section configured to prestore a value of the inherent offset possessed by the $\beta$ value calculation circuit;
    a subtracting section configured to subtract the value of the inherent offset from the $\beta$ value to create a corrected $\beta$ value; and
    a writing optical power setting section configured to set appropriate writing optical power based on the corrected $\beta$ value.

6. The optical disc apparatus as set forth in claim 5,
    wherein the $\beta$ value calculation circuit is configured to calculate the $\beta$ value as a digital value, and
    wherein the circuit offset storage section is configured to prestore the value of the inherent offset as a digital value.

7. The optical disc apparatus as set forth in claim 5,
    wherein the circuit offset storage section is capable of holding a plurality of values of the inherent offset, the plurality of values of the inherent offset being in correspondence with different kinds of media or manufacturers of media respectively, and one of the plurality of values of the inherent offset selected based on a recognized kind of medium or manufacturer is used in the subtracting section.

* * * * *